US010373620B2

(12) United States Patent
Edara

(10) Patent No.: US 10,373,620 B2
(45) Date of Patent: *Aug. 6, 2019

(54) KEYWORD DETERMINATIONS FROM CONVERSATIONAL DATA

(71) Applicant: Amazon Technologies, Inc., Reno, NV (US)

(72) Inventor: Kiran K. Edara, Cupertino, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,252

(22) Filed: Jun. 12, 2017

(65) Prior Publication Data

US 2017/0323645 A1 Nov. 9, 2017

Related U.S. Application Data

(63) Continuation of application No. 14/828,220, filed on Aug. 17, 2015, now Pat. No. 9,679,570, which is a continuation of application No. 14/447,487, filed on Jul. 30, 2014, now Pat. No. 9,111,294, which is a continuation of application No. 13/243,377, filed on Sep. 23, 2011, now Pat. No. 8,798,995.

(51) Int. Cl.

| | |
|---|---|
| ***G10L 15/00*** | (2013.01) |
| ***G10L 17/22*** | (2013.01) |
| ***G10L 15/18*** | (2013.01) |
| ***G06Q 30/02*** | (2012.01) |
| *G10L 15/08* | (2006.01) |

(52) U.S. Cl.

CPC .......... *G10L 17/22* (2013.01); *G06Q 30/0255* (2013.01); *G10L 15/00* (2013.01); *G10L 15/1822* (2013.01); *G10L 2015/088* (2013.01)

(58) Field of Classification Search

CPC ....... G10L 15/22; G10L 15/26; G10L 15/265; G10L 17/005

See application file for complete search history.

(56) References Cited

U.S. PATENT DOCUMENTS 5,410,611 A 4/1995 Huttenlocher et al.
5,913,028 A 6/1999 Wang et al.
6,564,213 B1 5/2003 Ortega et al.
6,633,846 B1 * 10/2003 Bennett ............ G06F 16/24522 704/257

(Continued)

*Primary Examiner* — Edgar X Guerra-Erazo
(74) *Attorney, Agent, or Firm* — Polsinelli LLP

(57) ABSTRACT

Topics of potential interest to a user, useful for purposes such as targeted advertising and product recommendations, can be extracted from voice content produced by a user. A computing device can capture voice content, such as when a user speaks into or near the device. One or more sniffer algorithms or processes can attempt to identify trigger words in the voice content, which can indicate a level of interest of the user. For each identified potential trigger word, the device can capture adjacent audio that can be analyzed, on the device or remotely, to attempt to determine one or more keywords associated with that trigger word. The identified keywords can be stored and/or transmitted to an appropriate location accessible to entities such as advertisers or content providers who can use the keywords to attempt to select or customize content that is likely relevant to the user.

20 Claims, 5 Drawing Sheets

(56) References Cited

U.S. PATENT DOCUMENTS

| | | | |
|---|---|---|---|
| 6,665,644 | B1 | 12/2003 | Kanevsky et al. |
| 6,714,909 | B1 | 3/2004 | Gibbon et al. |
| 6,757,362 | B1 | 6/2004 | Cooper et al. |
| 6,963,848 | B1 | 11/2005 | Brinkerhoff |
| 7,191,133 | B1 | 3/2007 | Pettay |
| 7,363,214 | B2 | 4/2008 | Musgrove et al. |
| 7,430,552 | B2 | 9/2008 | Cameron et al. |
| 7,509,230 | B2 | 3/2009 | Fernandez et al. |
| 7,523,085 | B2 | 4/2009 | Nigam et al. |
| 7,558,769 | B2 | 7/2009 | Scott et al. |
| 7,590,536 | B2 * | 9/2009 | Bates .................... G10L 15/197 704/231 |
| 7,613,692 | B2 | 11/2009 | Hamilton et al. |
| 7,634,406 | B2 | 12/2009 | Li et al. |
| 7,664,641 | B1 | 2/2010 | Pettay et al. |
| 7,739,115 | B1 | 6/2010 | Pettay et al. |
| 7,739,221 | B2 | 6/2010 | Lawler et al. |
| 7,937,265 | B1 | 5/2011 | Pasca et al. |
| 7,962,504 | B1 | 6/2011 | Mehanna |
| 7,966,187 | B1 | 6/2011 | Pettay et al. |
| 7,991,613 | B2 | 8/2011 | Blair |
| 8,370,145 | B2 | 2/2013 | Endo et al. |
| 8,396,732 | B1 | 3/2013 | Nies et al. |
| 8,504,437 | B1 | 8/2013 | Agarwal et al. |
| 8,798,995 | B1 * | 8/2014 | Edara ................. G06Q 30/0255 704/246 |
| 8,914,383 | B1 | 12/2014 | Weinstein et al. |
| 8,996,550 | B2 | 3/2015 | Ko et al. |
| 9,111,294 | B2 * | 8/2015 | Edara ................. G06Q 30/0255 |
| 9,213,705 | B1 * | 12/2015 | Story, Jr. ............. G06F 16/4393 |
| 9,679,570 | B1 * | 6/2017 | Edara ................. G06Q 30/0255 |
| 2003/0154072 | A1 | 8/2003 | Young et al. |
| 2004/0068406 | A1 | 4/2004 | Maekawa et al. |
| 2004/0078214 | A1 | 4/2004 | Speiser et al. |
| 2004/0113908 | A1 | 6/2004 | Galanes et al. |
| 2004/0193426 | A1 | 9/2004 | Maddux et al. |
| 2005/0091038 | A1 | 4/2005 | Yi et al. |
| 2005/0125216 | A1 | 6/2005 | Chitrapura et al. |
| 2006/0085248 | A1 | 4/2006 | Arnett et al. |
| 2006/0173859 | A1 | 8/2006 | Kim et al. |
| 2006/0200341 | A1 | 9/2006 | Corston-Oliver et al. |
| 2006/0200342 | A1 | 9/2006 | Corston-Oliver et al. |
| 2006/0212897 | A1 | 9/2006 | Li et al. |
| 2007/0078671 | A1 | 4/2007 | Dave et al. |
| 2007/0143122 | A1 | 6/2007 | Holloway et al. |
| 2007/0214000 | A1 | 9/2007 | Shahrabi et al. |
| 2007/0216764 | A1 * | 9/2007 | Kwak ................ G07C 9/00309 348/14.06 |
| 2008/0097758 | A1 | 4/2008 | Li et al. |
| 2008/0109232 | A1 | 5/2008 | Musgrove et al. |
| 2008/0215571 | A1 | 9/2008 | Huang et al. |
| 2008/0228728 | A1 | 9/2008 | Frank et al. |
| 2008/0249762 | A1 | 10/2008 | Wang et al. |
| 2008/0249764 | A1 | 10/2008 | Huang et al. |
| 2008/0300872 | A1 | 12/2008 | Basu et al. |
| 2008/0313180 | A1 | 12/2008 | Zeng et al. |
| 2009/0193011 | A1 | 7/2009 | Blair-Goldensohn et al. |
| 2009/0254408 | A1 | 10/2009 | McMillan |
| 2009/0287680 | A1 | 11/2009 | Paek et al. |
| 2009/0299752 | A1 | 12/2009 | Rodriguez et al. |
| 2009/0319342 | A1 | 12/2009 | Shilman et al. |
| 2010/0023311 | A1 | 1/2010 | Subrahmanian et al. |
| 2010/0169317 | A1 | 7/2010 | Wang et al. |
| 2010/0185569 | A1 | 7/2010 | Hu et al. |
| 2010/0306249 | A1 | 12/2010 | Hill et al. |
| 2011/0054895 | A1 | 3/2011 | Phillips et al. |
| 2014/0337028 | A1 * | 11/2014 | Wang .................. H04M 1/6075 704/251 |
| 2016/0275588 | A1 * | 9/2016 | Ye ......................... G06F 3/0488 |

* cited by examiner

KEYWORD DETERMINATIONS FROM CONVERSATIONAL DATA

CROSS-REFERENCES TO RELATED APPLICATIONS

This application is a continuation of U.S. application Ser. No. 14/828,220, filed Aug. 17, 2015, which is a continuation of U.S. application Ser. No. 14/447,487, filed Jul. 30, 2014, now issued as U.S. Pat. No. 9,111,294, which is a continuation of U.S. application Ser. No. 13/243,377, filed Sep. 23, 2011, now issued as U.S. Pat. No. 8,798,995; of which the full disclosures of these applications are incorporated herein by reference for all purposes.

BACKGROUND

As users increasingly utilize electronic environments for a variety of different purposes, there is an increasing desire to target advertising and other content that is of relevance to those users. Conventional systems track keywords entered by a user, or content accessed by a user, to attempt to determine items or topics that are of interest to the user. Such approaches do not provide an optimal source of information, however, as the information is limited to topics or content that the user specifically searches for, or otherwise accesses, in an electronic environment. Further, there is little to no context provided for the information gathered. For example, a user might search for a type of gift for another person that results in keywords for that type of gift being associated with the user, even if the user has no personal interest in that type of gift. Further, the user might browse information that goes against the user's preferences or personal beliefs, which might result in the user receiving advertisements for that information, which might upset the user or at least degrade the user experience.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to determining content that likely is of interest of users. In particular, various embodiments enable the capture and analysis of voice data to extract keywords that are likely of personal interest to a user. In at least some embodiments, a "sniffer" algorithm, process, or module can listen to a stream of audio content, typically corresponding to voice data of a user, to attempt to identify one or more trigger words in the audio content. Upon detecting a trigger word, one or more algorithms can attempt to determine keywords associated with that trigger word. If the trigger word is a positive trigger word, as discussed later herein, the keyword can be associated with the user. If the trigger word is a negative word, the keyword can still be associated with a user, but as an indicator of a topic that is likely not of interest to the user.

In at least some embodiments, a computing device such as a smart phone or tablet computer can actively listen to audio data for a user, such as may be monitored during a phone call or recorded when a user is within a detectable distance of the device. In some embodiments, the use of the device can be indicative of the user providing the audio, such as a person speaking into the microphone of a smart phone. In other embodiments, voice and/or facial recognition, or another such process, can be used to identify a source of a particular portion of audio content. If multiple users or persons are able to be identified as sources of audio, the audio content can be analyzed for each of those identified users and potentially associated with those users as well.

In at least some embodiments, the keywords or phrases extracted from the audio can be used to determine topics of potential interest to a user. These topics can be used for a number of purposes, such as to target relevant ads to the user or display recommendations to the user. In a networked setting, the ads or recommendations might be displayed to the user on a device other than the device that captured or analyzed the audio content. The ads or recommendations, or potentially a list of likes and dislikes, can also be provided for friends or connections of a given user, in order to assist the user in selecting a gift for those persons or performing another such task. In at least some embodiments, a user can have the option of activating or deactivating the sniffing or voice capture processes, for purposes such as privacy and data security.

Figure 1:
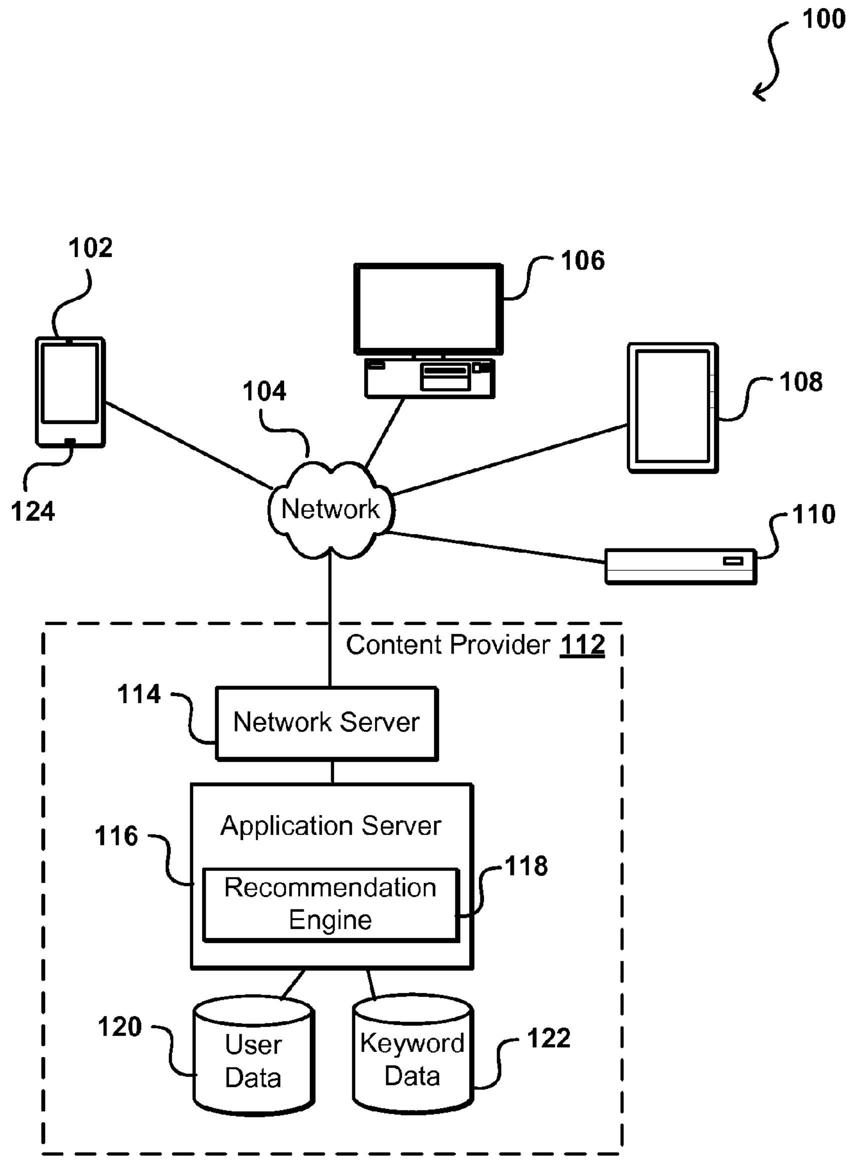
FIG. 1 illustrates an environment in which various aspects of a keyword determination process can be utilized in accordance with various embodiments.

FIG. 1 illustrates an example of an environment 100 in which various aspects of the various embodiments can be implemented. In this example a user can talk into a computing device 102, which is illustrated as a smart phone in this example. It should be understood, however, that any appropriate electronic device, such as may include a conventional cellular phone, tablet computer, a desktop computer, a personal media player, an e-book reader, or a video game system can be utilized as well within the scope of the various embodiments. In this example, voice content spoken into a microphone 124 or other audio capture element of the computing device 124 is analyzed by one or more processes or algorithms on the computing device to attempt to extract keywords, phrases, or other information that is relevant to the user speaking the content. In a keyword example, any keywords extracted for the user can be sent across one or more networks 104, as may include the Internet, a local area network (LAN), a cellular network, and the like, to at least one content provider 112, or other such entity or service. In this example, a network server 114 or other such device capable of receiving requests and other information over the at least one network 104 is able to analyze information for a request including the one or more keywords and direct that request, or a related request, to an appropriate component, such as at least one application server 116 operable to handle keywords extracted for various users. An application server 116 is operable to parse the request to determine the user associated with the request, such as by using information stored in at least one user data store 120, and the keywords to be associated with that user. The same or a different application server can compare the keywords in the request to the keywords associated with that user as stored in at least one keyword data store 122 or other such location, and can update keyword information stored for the user. This can include, for example, adding keywords that were not previously associated with the user or updating a weighting, date, score, or other such value for keywords that are already associated with the user but that might now be determined to be more relevant due to a more recent occurrence of that keyword. Various other processes for updating keywords associated with a user can be utilized as well within the scope of the various embodiments.

Keywords associated with the user can be used for any appropriate purpose, such as for recommending advertising, product information, or other such content to the user. In this example, a recommendation engine 118 executing on one or more of the application servers 116 of the content provider 112 can receive a request to serve a particular type of content (e.g., advertising) to a user, and can determine keywords associated with that user using information stored in the user and/or keyword data stores 120, 122. The recommendation engine can use any appropriate algorithm or process, such as those known or used in the art, to select content to be provided to the user. In this example, the content can be provided to any device associated with the user, such as the computing device 102 that captured at least some of the keyword information from voice data, or other devices for that user such as a desktop computer 106, e-book reader 108, digital media player 110, and the like. In some embodiments these devices might be associated with a user account, while in other embodiments a user might login or otherwise provide identifying information via one of these devices, which can be used to request and/or receive the recommended content.

Figure 2:
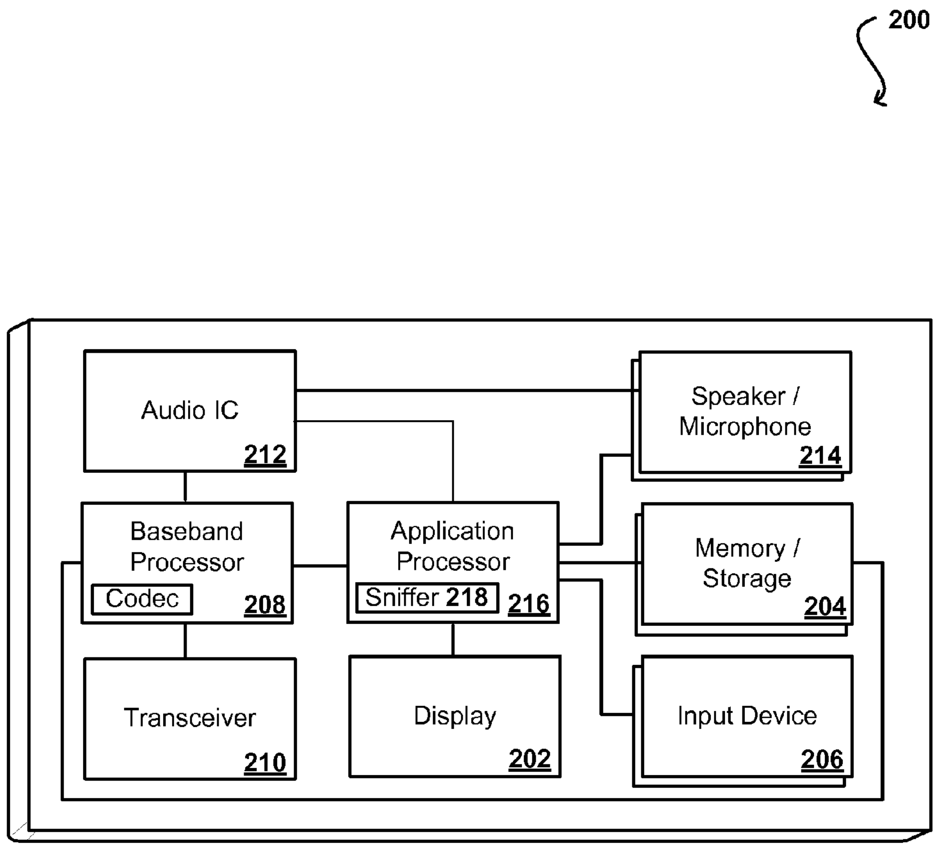
FIG. 2 illustrates components of an example computing device that can be utilized in accordance with various embodiments.

FIG. 2 illustrates a set of components of an example computing device 200 that can be used to analyze voice content and attempt to extract relevant keywords for one or more users in accordance with various embodiments. It should be understood, however, that there can be additional, fewer, or alternative components in similar or alternative configurations in other such computing devices. In this example, the device includes conventional components such as a display element 202, device memory/storage 204, and one or more input devices 206. The device in this example also includes audio components 214 such as a microphone and/or speaker operable to receive and/or transmit audio content. Audio data, such as voice content, captured by at least one of the audio components 214 can be transmitted to an audio processing component 212, such as an audio chipset or integrated circuit board including hardware, software, and/or firmware for processing the audio data, such as by performing one or more pre- or post-processing functions on the audio data as known in the art for such purposes. The processed audio, which can be in the form of a pulse-code modulation (PCM) data stream or other such format, can be directed through at least one voice sniffer algorithm or module 218 executing on, or produced by, at least one application processor 216 (e.g., a CPU). The sniffer algorithms can be activated upon the occurrence of any appropriate action, such as the initiation of a voice recording, the receiving of a phone call, etc. In at least some embodiments, the sniffer algorithms read audio information from one or more registers of the audio IC 212. The audio can be read from registers holding data received from a microphone, transceiver, or other such component.

In at least some embodiments, a voice sniffer algorithm can be configured to analyze the processed audio stream in near real time to attempt to identify the occurrence of what are referred to herein as "trigger words." A trigger word is often a verb indicating some level of desire or interest in a noun that follows the trigger word in a sentence. For example, in sentences such as "I love skiing" or "I like to swim" the words "like" and "love" could be example trigger words indicating a level of interest in particular topics, in this case swimming and skiing. A computing device 200 could store, such as in memory 204 on the device, a set of positive trigger words (e.g., prefer, enjoy, bought, downloaded, etc.) and/or negative trigger words (e.g., hate, dislike, or returned) to be used in identifying potential keywords in the audio data. A voice sniffer algorithm could detect the presence of these trigger words in the audio, and then perform any of a number of potential actions.

In one embodiment, a voice sniffer algorithm can cause a snippet or portion of the audio including and/or immediately following the trigger word to be captured for analysis. The audio snippet can be of any appropriate length or size, such as may correspond to an amount of time (e.g., 5 seconds), an amount of data (e.g., up to 5 MB), up to a pause of voice data in the audio stream, or any other such determining factor. In some embodiments a rolling buffer or other such data cache can be used to also capture a portion of voice data immediately prior to the trigger word to attempt to provide context as discussed elsewhere herein. In some embodiments, these audio snippets are analyzed on the computing device using one or more audio processing algorithms executing on an application processor 216, while in other embodiments the snippets can be transmitted over a network to another party, such as a content provider, for analysis.

In at least some embodiments, the audio can be analyzed or processed using one or more speech recognition algorithms or natural language processing algorithms. For example, the captured audio can be analyzed using acoustic and/or language modeling for various statistically-based speech recognition algorithms. Approaches relying on Hidden Markov models (HMMs) and dynamic time warping (DTW)-based speech recognition approaches can be utilized as well within the scope of the various embodiments.

In this example, one or more algorithms or modules executing on the device can analyze the snippet to attempt to determine keywords corresponding to the detected trigger words. Various algorithms can be used to determine keywords for a set of trigger words in accordance with the various embodiments. The keywords can be any appropriate words or phrases, such as a noun, a proper name, a brand, a product, an activity, and the like. In at least some embodiments, one or more algorithms can remove stop words or other specific words that are unlikely to be useful keywords, such as "a," "the," and "for," among others common for removal in processing of natural language data. For example, the sentence "I love to ski" could result in, after processing, "love ski," which includes a trigger word ("love") and a keyword ("ski"). In embodiments where processes can attempt to determine keywords for multiple users, and where data before trigger words are analyzed as well, a process might also identify the word "I" as an indicator of the user that should be associated with that keyword. For example, if the sentence had instead been "Jenny loves to ski" then that process might associate the keyword "ski" with user Jenny (if known, identified, etc.)

instead of the user speaking that sentence. Various other approaches can be used as well within the scope of the various embodiments.

In some embodiments, the snippets can be analyzed to search for other content as well, such as "close words" as known in the art. One or more embodiments can attempt to utilize natural language and/or speech recognition algorithms to attempt to derive a context or other level of understanding of the words contained in the snippets, in order to more accurately select keywords to be associated with a particular user. Approaches such as the Hidden Markov models (HMMs) and dynamic time warping (DTW)-based speech recognition approaches discussed above can be used to analyze the audio snippets as well in at least some embodiments. Once the words of the audio are determined, one or more text analytics operations can be used to attempt to determine a context of those words. These operations can help to identify and/or extract contextual phrases using approaches such as clustering, N-gram detection, noun-phrase extraction, and theme determination, among others.

In some embodiments, an audio processing algorithm might also determine a type of interest in a particular keyword. For example, a phrase such as "love to paint" might result in a keyword to be associated with a user, but a phrase such as "hate to draw" might also result in a keyword to be associated with that user. Since each trigger word indicates a different type of interest, an algorithm might also generate a flag, identifier, or other indicia for at least one of the keywords to indicate whether there is positive or negative interest in that keyword. In cases where keywords are stored for a user, in some embodiments the positive and negative interest keywords might be stored to different tables, or have additional data stored for the type of interest. Similarly, the stored keywords might have additional data indicating another person to be associated with that keyword, such as where the user says "my mother loves crossword puzzles." In such an instance, the keyword or phrase "crossword puzzle" can be associated with the user, but more specifically can be associated in a context of that user's mother.

In at least some embodiments, one or more algorithms will also attempt to process the keywords to determine a stem, alternate form, or other such keyword that might be associated with that user. For example, the term "crossword puzzles" might be shortened to the singular version or stem "crossword puzzle" using processes known in the art. Further, separate keywords such as "crossword" and "puzzle" might also be determined as keywords to be associated with the user. In some embodiments, the analysis of the keywords into stems or alternatives might be performed by another entity, such as a content provider as discussed elsewhere herein.

In at least some embodiments, the keywords that are identified to be associated with a user are stored, at least temporarily, to a database in memory or storage 204 on the computing device. For applications executing on the device that utilize such information, those applications can potentially access the local database to determine one or more appropriate keywords for a current user. In at least some embodiments additional data can be stored for identified keywords as well. For example, a timestamp or set of geographic coordinates can be stored for the time and/or location at which the keyword was identified. Identifying information can be stored as well, such as may identify the speaker of the keyword, a person associated with the keyword, people nearby when the keyword was spoken, etc. In at least some embodiments priority information may be attached as well. For example, a keyword that is repeated multiple times in a conversation might be given assigned a higher priority than other keywords, tagged with a priority tag, or otherwise identified. Similarly, a keyword following a "strong" trigger word such as "love" might be given a higher priority or weighting than for an intermediate trigger word such as "purchased." In at least some embodiments, the processing and storing can be done in near real time, such as while the user is still speaking, on the phone, or otherwise generating voice content or other audio data.

In at least some embodiments the computing device can be configured to send the identified keywords (or audio snippets, etc.) to another party over at least one network or connection. In this example, the application processor can cause the keywords to be passed to a baseband processor 208 or other such component that is able to format the data into appropriate packets, streams, or other such formats and transmit the data to another party using at least one transceiver 210. The data can be transmitted using any appropriate signal, such as a cellular signal or Internet data stream, etc. As known in the art for such purposes, one or more codecs can be used to encode and decode the voice content.

In at least some embodiments, the keywords for a user might be transmitted to a content provider or other such party, whereby the provider is able to store the keywords in a data store for subsequent use with respect to the user. In some embodiments, a copy of the keywords will be stored on the computing device capturing the voice content as well as by the content provider. In other embodiments, keywords might be stored on the computing device for only a determined amount of time, or in a FIFO buffer, for example, while in other embodiments the keywords are deleted from the computing device when transferred to, and stored by, the content provider. In some instances, a central keyword or interest service might collect and store the keyword information, which can then be obtained by a third party such as a content provider. Various other options exist as well.

In some embodiments, a local data store and a data store hosted remotely by a content provider (referred to hereinafter as a "cloud" data store) can be synced periodically, such as once a day, every few hours, or at other such intervals. In some embodiments the local data store might hold the keywords until the end of a current action, such as the end of a phone call or the end of a period of audio capture, and then transmit the keyword data to the cloud data store at the end of the action. In an embodiment where audio segments are uploaded to the cloud or a third party provider for analysis, for example, the audio might be transmitted as soon as it is extracted, in order to conserve storage capacity on the computing device. When analysis is done in the cloud, for example, identified keywords might be pushed to the local data store as well as a cloud data store (or other appropriate location) for subsequent retrieval. An advantage to transmitting information during or at the end of an activity, for example, is that corresponding recommendations or actions can be provided to the user during or at the end of an activity, when those recommendations or actions can be most useful.

In some embodiments, the keyword data transmission can "piggy-back" onto, or otherwise take advantage of, another communications channel for the device. The channel can be utilized at the end of a transmission, when data is already being transmitted to the cloud or another appropriate location, or at another such time. For example, an e-book reader or smart phone might periodically synchronize a particular type of information with a data store in the cloud. In at least some embodiments where messages are already intended for a content provider, for example, the keyword information can be added to the existing messages in order to conserve bandwidth and power, among other such advantages. In some embodiments, existing connections can be left active for a period of time to send additional data packets for the keyword data.

For example, if a user mentions a desire to travel to Paris while on a call, a recommendation for a book about Paris or an advertisement for travel site might be presented at the end of the call, when the user might be interested in such information. Similarly, if the user mentions how much the user would like to go to a restaurant while on the phone, a recommendation might be sent while the user is still engaged in the conversation that enables the user to make a reservation at the restaurant, or provides a coupon or dining offer for that restaurant (or a related restaurant) during the call, as providing such information after the call might be too late if the user makes other plans during the conversation. In either case, the information can be stored for use in subsequent recommendations.

In some embodiments, there might be various types of triggers that result in different types of action being taken. For example, if a user utters a phrase such as "reserve a table" or "book a hotel" then trigger words such as "reserve" and "book" might cause information to be transmitted in real time, as relevant recommendations or content might be of interest to the user at the current time. Other phrases such as "enjoy folk music" might not cause an immediate upload or transfer, for reasons such as to conserve bandwidth, but might be uploaded or transferred at the next appropriate time. In some embodiments, the location of the user can be sent with the keyword data, as mentioned, such that the location can be included in the recommendation. For example, if the user loves Italian food then the keyword and location data might be used to provide a coupon for an Italian restaurant near the user's current location. A priority tag or other information might also be transmitted to cause the recommendation to be sent within a current time period, as opposed to some future request for content.

Figure 3:
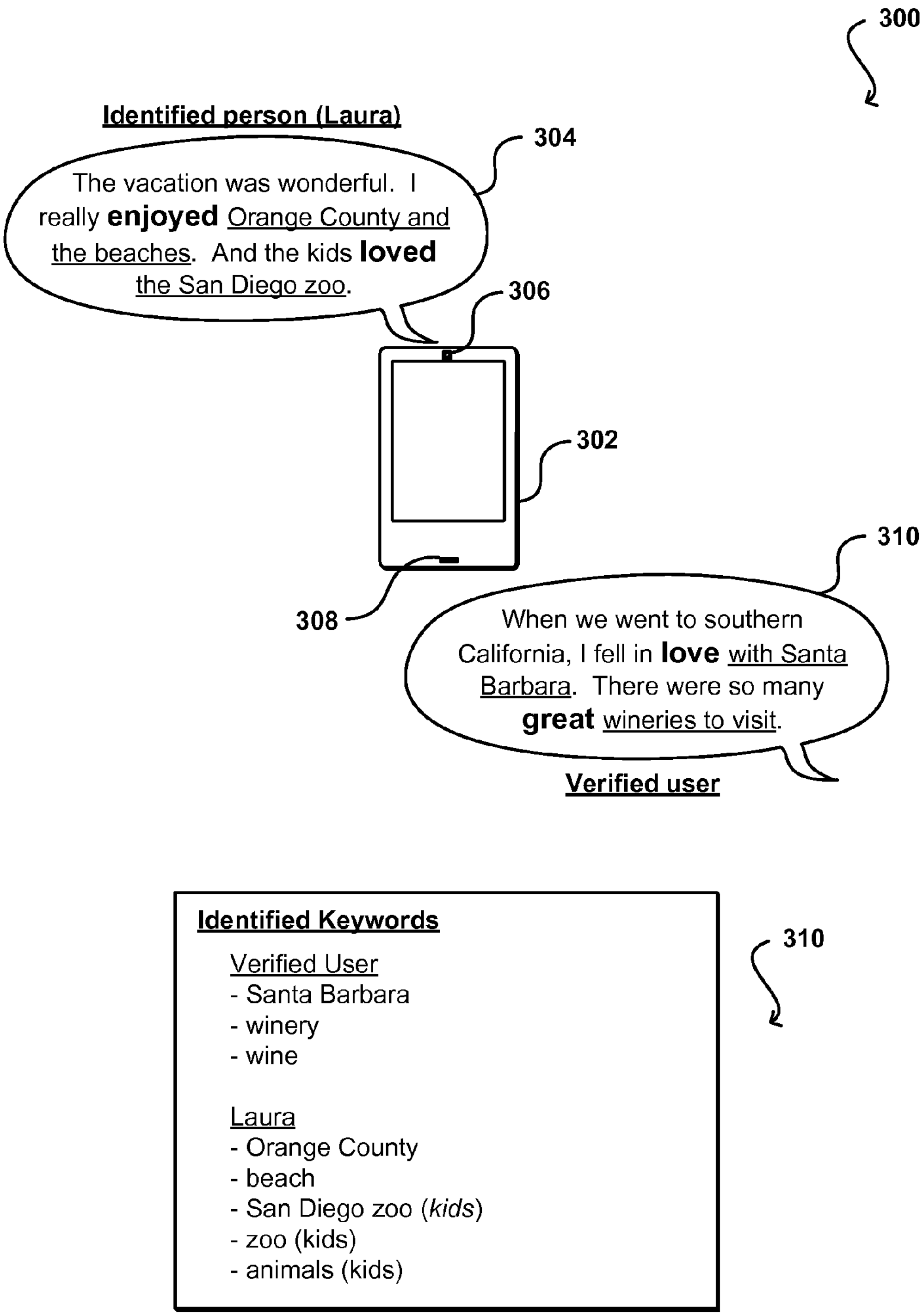
FIG. 3 illustrates example voice content received to an electronic device and keywords extracted from that voice content in accordance with various embodiments.

FIG. 3 illustrates an example situation 300 wherein a telephone conversation is occurring between two people. The user of a smart phone 302 is speaking into a microphone 308 of the smart phone, and the voice content from the other person is received by a transceiver of the phone and played through a speaker 306. Approaches to operating a phone and conveying voice data are well known in the art and will not be discussed herein in detail. As illustrated previously in FIG. 2, one or more sniffer algorithms can listen to the audio content received from the user through the microphone 308 and from the other person via the transceiver or other appropriate element, or from the processing components to the speaker. In some embodiments, the smart phone 302 can be configured such that audio is only captured and/or analyzed for the user of the phone, in order to ensure privacy, permission, and other such aspects. In other embodiments, such as where the other person has indicated a willingness to have voice content analyzed and has been identified to the phone through voice recognition, identification at the other person's device, or using another such approach, voice content for the other person can be captured and/or analyzed as well. In some embodiments, each user's device can capture and/or analyze voice data for a respective user, and keyword or other such data can be stored on the respective devices, sent to other devices, aggregated in a cloud data store, or otherwise handled within the scope of the various embodiments.

In this example, the smart phone 302 has verified an identity and authorization from both the user and the other person, such that voice data can be analyzed for both people. The user speaks voice content (represented by the respective text bubble 304) that is received by the microphone and processed as discussed above. In this example, the sniffer algorithms can pick up the trigger words "love" and "great" in the voice data from the user, and extract at least the corresponding portions of the voice data, shown in underline in the figure to include the phrases "with Santa Barbara" and "wineries to visit." As discussed above, stop words can be removed and algorithms utilized to extract keywords such as "wineries" and Santa Barbara from the user's voice data.

Similarly, the sniffer algorithms can analyze the voice data (represented by the respective text bubble 310) received from the other person (Laura). In this example, the sniffer algorithm can similarly pick up the trigger words "enjoyed" and "loved" in the voice data, and extract the keywords "Orange County," "beaches," and "San Diego zoo." In this example, however, the algorithms also analyzed voice information received directly before the trigger word "loved" such that the algorithms can determine the interest did not necessarily lie with the speaker, but with the "kids" of the speaker. Such an approach can be beneficial in other situations as well, such as where a user says "I do not like peas," where if words before the trigger word were not analyzed could potentially be treated as "like peas."

During this portion of the conversation the algorithms can cause data to be stored to a local data store on the smart phone 302 such as that illustrated in the example table 310. Keywords associated with the verified user and with the identified other person are displayed. Also, it can be seen that variations of the keywords such as "wine" and "winery" can be associated with a user in at least some embodiments, which can help with recommendations in at least some cases. Further, it can be seen that some of the keywords associated with Laura have additional data indicating that these keywords are associated with Laura's kids, and not necessarily with Laura herself. As discussed, various information such as timestamps, locations, and other such information can be stored to the data store as well in other embodiments. Further, the example table should be taken as illustrative, and it should be understood that such tables can take any appropriate form known or used in the art for storing information in accordance with the various embodiments.

Figure 4:
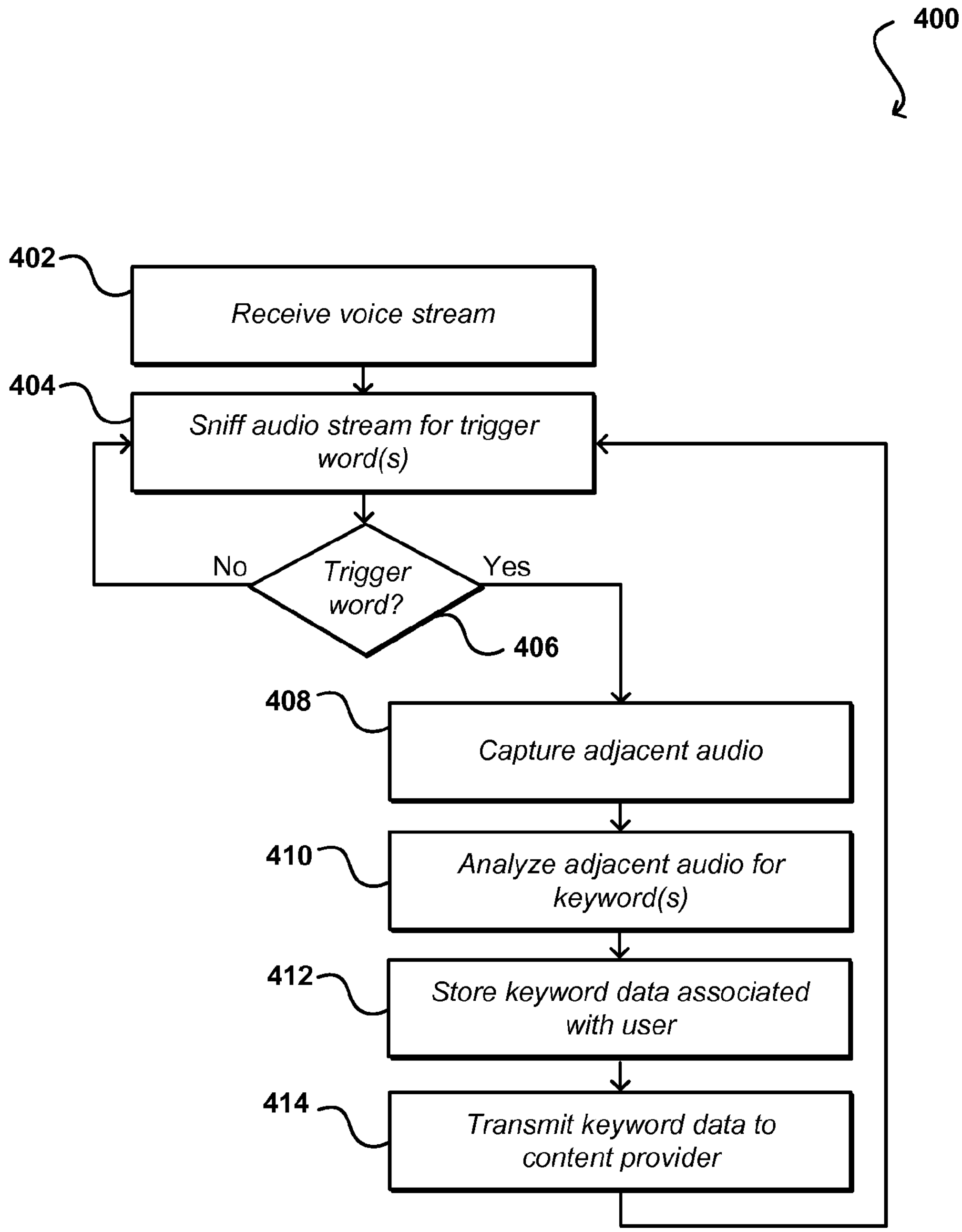
FIG. 4 illustrates an example process for extracting keywords from voice content that can be used in accordance with various embodiments.

FIG. 4 illustrates an example process for determining keywords from voice content that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a voice stream is received 402 for at least one user to a computing device. As mentioned, this can include a user speaking into a smart phone, having audio recorded by a portable computing device, etc. After any desired audio processing, at least one sniffer algorithm or component can sniff and/or analyze 404 the audio stream to attempt to locate one or more trigger words in the audio content. If no trigger words are found 406, the computing device can continue to sniff audio content or wait for subsequent audio content. If a likely trigger word is found in the voice content, at least a portion of the adjacent audio can be captured 408, such as a determined amount (e.g., 5-10 seconds, as may be user configurable) immediately before and/or after the trigger word. In this example, the adjacent audio is analyzed 410 to attempt to determine one or more keywords, as well as potentially any contextual information for those keywords. As discussed, in some embodiments the captured audio can be uploaded to another system or service for analysis or other processing. Any keyword located in the captured audio can be stored 412 on the device, such as to a local data store, and associated with the user. As mentioned, other data such as timestamps or location data can be stored as well. At one or more appropriate times, the keyword data can be transmitted 414 to a content provider, or other entity, system, or service, which is operable to receive and store the keyword data associated with the user, or any other identified person for which keyword data was obtained.

Figure 5:
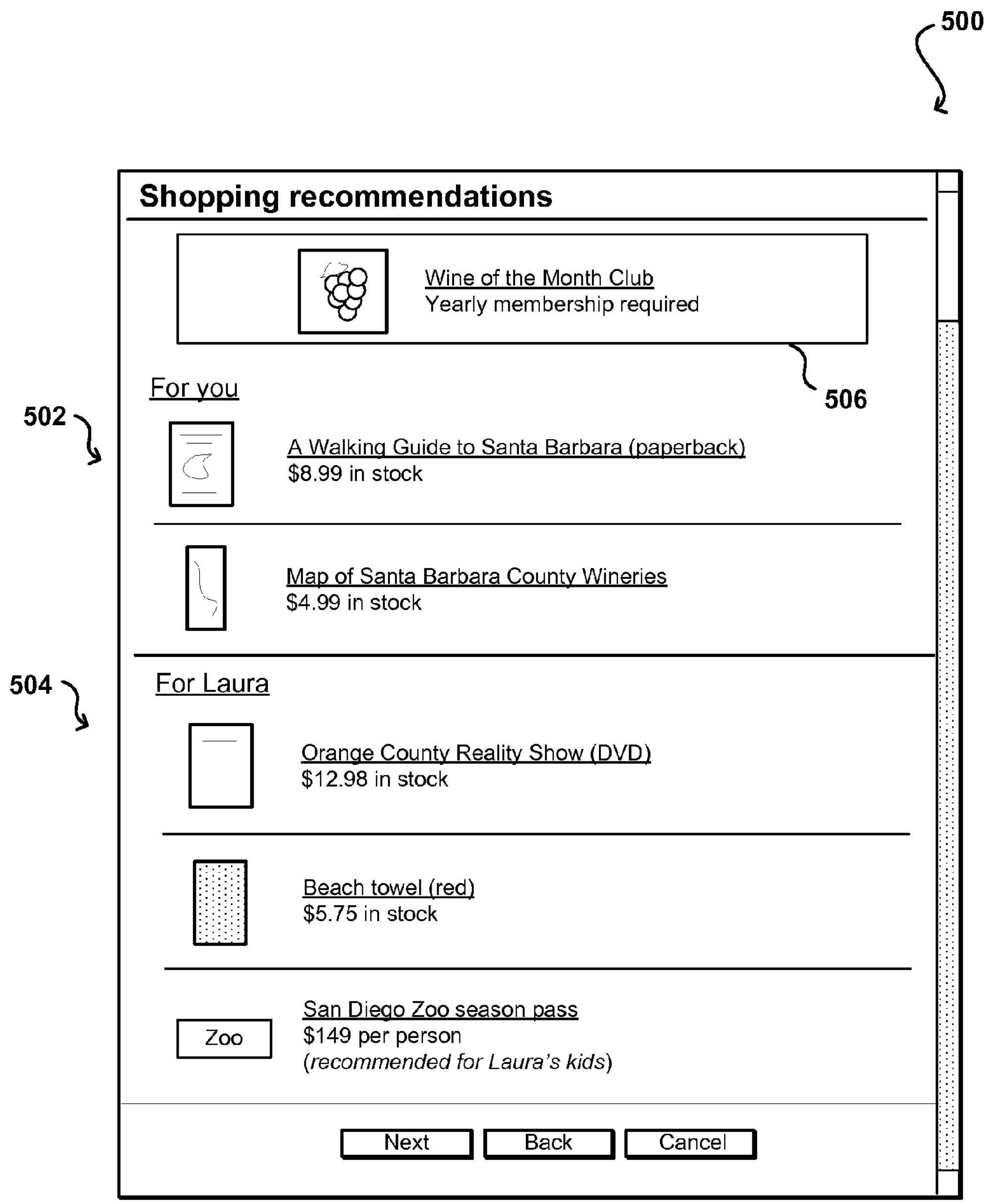
FIG. 5 illustrates an example interface including advertising and shopping suggestions using keywords obtained from voice content in accordance with at least one embodiment.

Once keyword data is stored for a user, that keyword data can be used to determine and/or target content that might be of interest to that user. For example, FIG. 5 illustrates an example interface page 500 that might be displayed to a user in accordance with at least one embodiment. In this example, the page includes an advertisement 506. Using any appropriate selection mechanism known or used in the art, an advertising entity can obtain keyword data for the user as extracted in FIG. 4 and use that information to select an ad to display to the user. In this example, the advertising entity located the keyword "wine" associated with the user and, based on any appropriate criteria known or used for such purposes, selected an ad relating to wine to display to the user. Similarly, a provider of an electronic marketplace which the user is accessing has selected a number of different product recommendations 502 to provide to the user based on the keywords extracted for that user as well. In addition, the electronic marketplace has identified Laura as one of the user's friends, whether through manual input, social networking, or another such approach. Accordingly, the provider has selected recommendations 504 for gifts for Laura based on the keywords that were extracted for her in FIG. 4. Various uses of keywords or other such data for recommendations or content selection can utilize keyword data obtained using the various processes herein as should be apparent in light of the present disclosure.

While phone conversations are described in many of the examples herein, it should be understood that there can be various situations in which voice data can be obtained. For example, a user might talk to a friend about purchasing a mountain bike within an audio capture distance of that user's home computer. If the user has authorized the home computer to listen for, and analyze, voice content from the user, the computer can obtain keywords from the conversation and automatically provide recommendations during the conversation, such as by displaying one or more Web sites offering mountain bikes, performing a search for mountain bikes, etc. If the user discusses an interest in a certain actor, the computer could upload that information to a recommendations service or similar entity that could provide recommendations or content for movies starring that actor. In some embodiments, a list of those movies (or potentially one or more of the movies themselves) could be pushed to a digital video recorder or media player associated with the user, whereby the user could purchase, download, stream, or otherwise obtain any of those movies that are available. As should be apparent, when multiple types of device are associated with a user, there can be different types of recommendations or content for at least some of those devices. As mentioned, media players might get movie or music recommendations, e-book readers might get book recommendations, etc. In some situations the recommendations might depend upon the available channels as well. For example, if a user is on a smart phone and only has a conventional cellular data connection, the device might not suggest high definition video or other bandwidth-intensive content, but might go ahead and recommend that content when the user has a different connection (e.g., a Wi-Fi channel) available. Various other options can be implemented as well.

As mentioned, in at least some embodiments the keyword data can include timestamp data as well. Such information can be used to weight and/or decay the keyword data, in order to ensure that the stored keywords represent current interests of the user. For example, a teenager might change musical tastes relatively frequently, such that it is desirable to ensure recommendations represent the teenager's current interests in order to improve the performance of the recommendations. Similarly, a user might be interested in camping gear during the summer, but not during the winter. A user might also be interested in information about Italy before a vacation, but not afterwards. Thus, it can be advantageous in at least some situations to enable the keywords to have a decaying weight or value for recommendations over time. As discussed, however, if a keyword is detected again then the more recent timestamp can be used, or higher priority given, for example, in order to express that the keyword still has some interest by the user.

As should be understood, the sets of trigger words can vary for different types of users. For example, different sets can be used based on factors such as language selection or geographic area. At least one language dictionary might be selected for (or by) a particular user, with one or more appropriate sets of keywords being selected from that dictionary for that user. In some embodiments, a smart device can also update a set of trigger words over time, such as by downloading or receiving updates from another source, or by learning keywords from user behavior or input. Various other update approaches can be used as well.

There can be various approaches to providing recommendations to a user as well. As illustrated, advertising or content can be provided for display to the user on a display of a computing device. If a user is in the middle of a conversation on a smart phone, however, the user might not want or know to pull the phone away from the user's ear in order to see information displayed on the screen. In some embodiments, a notification such as a vibration or sound can be generated to notify the user of the recommendation. In other embodiments, however, the recommendation can be provided to the user through an appropriate audio mechanism. For example, a speech generation algorithm can generate speech data for the recommendation and cause that information to be conveyed to the user through a speaker of the phone. Thus, if a user is interested in a particular restaurant for Saturday night, the phone might "whisper" to the user that a reservation is available for that night, or provide other such information. The information can be conveyed at any volume or with any other such aspects, as may be user-configurable. In some embodiments, the voice data can be generated by a remote system or service and then transmitted to the phone to convey to the user, using the same or a different communication channel than the call. In some embodiments everyone on the call can hear the recommendation, while in other embodiments only the user can hear the recommendation.

As discussed, some embodiments enable voice data to be recorded when there are multiple people generating audio content. In at least some embodiments, at least one voice recognition process can be used to attempt to determine which audio to analyze and/or who to associate with that audio. In some embodiments, one or more video cameras might capture image information to attempt to determine which user is speaking, as may be based on lip movement or other such indicia, which can be used to further distinguish voice data from different sources, such as where only one or more of the faces can be recognized. Various other approaches can be used as well within the scope of the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. Information can also be conveyed using standards or protocols such as Wi-Fi, 2G, 3G, 4G, CDMA, WiMAX, long term evolution (LTE), HSPA+, UMTS, and the like. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:

determining that first audio data, sent from a first computing device to a second computing device, represents at least one trigger word, the determining including processing the first audio data using first data stored by the first computing device, using at least a computer-implemented speech processing algorithm;

receiving second audio data sent from the first computing device to the second computing device within a specified time period of the first audio data;

determining that the second audio data represents at least one keyword;

determining identity information associated with the first computing device using at least voice recognition and the second audio data;

determining content based at least in part on the at least one keyword and the identity information associated with the first computing device; and sending the content to the first computing device.

2. The computer-implemented method of claim 1, further comprising storing, in a remote database, at least one of the trigger word or the keyword.

3. The computer-implemented method of claim 1, further comprising causing the first computing device to output the content on a display device.

4. The computer-implemented method of claim 1, further comprising causing the first computing device to output the content as audio.

5. The computer-implemented method of claim 1, further comprising:

determining a location of the first computing device; and determining the content based at least in part on the location.

6. The computer-implemented method of claim 1, further comprising:

determining a first value associating the at least one keyword with a user;

determining, based at least on a change in relevance of the keyword to the user, a second value associating the at least one keyword with the user; and storing the second value in a database.

7. The computer-implemented method of claim 6, further comprising determining the content based at least on the keyword and the second value.

8. The computer-implemented method of claim 1, further comprising:

determining a first and a second item of content associated with the at least one keyword;

determining a first relevance of the first item of content;

determining a second relevance of the second item of content;

sending the first and second items of content and associated relevance to the first computing device; and receiving a selection of the second item of content.

9. A computer-implemented method, comprising:

determining that first audio data, sent from a first computing device to a second computing device, represents at least one trigger word, the determining including processing the first audio data using first data stored by the first computing device, using at least a computer-implemented speech processing algorithm;

determining that second audio data sent within a specified time period of the first audio data represents at least one keyword;

determining second information indicative of an identity associated with the first computing device using at least voice recognition and the second audio data;

sending to a third computing device, first information indicative of the at least one keyword and the second information indicative of an identity associated with the first computing device; and receiving from the third computing device, content associated with the at least one keyword and associated with the identity.

10. The computer-implemented method of claim 9, further comprising storing, in a local database, at least one of the trigger word or the keyword.

11. The computer-implemented method of claim 9, further comprising outputting the content on a display of the first computing device.

12. The computer-implemented method of claim 9, further comprising outputting the content as audio using a speaker of the first computing device.

13. The computer-implemented method of claim 9, further comprising:

determining a first value associating the at least one keyword with a user;

determining, based at least on a change in relevance of the keyword to the user, a second value associating the at least one keyword with the user;

storing the second value in a local database; and determining the content based at least on the keyword and the second value.

14. The computer-implemented method of claim 9, further comprising:

determining a first and a second item of content associated with the at least one keyword;

determining a first relevance of the first item of content;

determining a second relevance of the second item of content;

displaying, based at least in part on the first relevance and the second relevance, the first item of content and the second item of content; and receiving a selection of the second item of content.

15. A computing system, comprising:

at least one processor; and memory including instructions that, when executed by the at least one processor, cause the computing system to:

determine that first audio data, sent from a first computing device to a second computing device, represents at least one trigger word, the determination including processing the first audio data using first data stored by the first computing device, using at least a computer-implemented speech processing algorithm;

determine that second audio data sent within a specified time period of the first audio data represents at least one keyword;

determine second information indicative of an identity associated with the first computing device using at least voice recognition and the second audio data;

send to a third computing device, first information indicative of the at least one keyword and the second information indicative of an identity associated with the first computing device; and receive from the third computing device, content associated with the at least one keyword and associated with the identity.

16. The computing system of claim 15, further comprising a database, the memory further including instructions that, when executed by the processor, cause the computing system to store, in a local database, at least one of the trigger word or the keyword.

17. The computing system of claim 15, further comprising a display device, the memory further including instructions that, when executed by the processor, cause the computing system to output the content on the display device.

18. The computing system of claim 15, further comprising a speaker, the memory further including instructions that, when executed by the processor, cause the computing system to output the content as audio using the speaker.

19. The computing system of claim 15, further comprising a location determining device, the memory further including instructions that, when executed by the processor, cause the computing system to:

determine a location of the first computing device; and determine the content based at least on the location.

20. The computing system of claim 15, further comprising a database, the memory further including instructions that, when executed by the processor, cause the computing system to:

determine a first value associating the at least one keyword with a user;

determine, based at least in a change in relevance of the keyword to the user, a second value associating the at least one keyword with the user;

store the second value in the database; and determine the content based at least on the keyword and the second value.

* * * * *